(12) United States Patent
Beckon

(10) Patent No.: US 8,740,285 B2
(45) Date of Patent: Jun. 3, 2014

(54) VEHICLE AIRFOILS FOR SAFETY, EFFICIENCY, AND PERFORMANCE

(76) Inventor: William Nelson Beckon, Davis, CA (US)

(*) Notice: Subject to any disclaimer, the term of this patent is extended or adjusted under 35 U.S.C. 154(b) by 0 days.

(21) Appl. No.: 12/251,314

(22) Filed: Oct. 14, 2008

(65) Prior Publication Data

US 2010/0090497 A1    Apr. 15, 2010

(51) Int. Cl.
| | | |
|---|---|---|
| *B62D 37/02* | (2006.01) | |
| *B60Q 1/26* | (2006.01) | |
| *B60J 7/22* | (2006.01) | |
| *B60R 9/05* | (2006.01) | |

(52) U.S. Cl.
USPC ............... 296/180.5; 296/180.1; 296/180.3

(58) Field of Classification Search
USPC ............ 296/180.1, 217, 180.2, 108.3, 180.4, 296/180.5, 91; 188/2 R; 180/903; 244/219, 244/201, 218, 123.1, 99.12
See application file for complete search history.

(56) References Cited

U.S. PATENT DOCUMENTS

| | | | | | |
|---|---|---|---|---|---|
| 4,079,984 | A | * | 3/1978 | Powell | 296/180.3 |
| 4,432,516 | A | * | 2/1984 | Muscatell | 244/219 |
| 4,558,898 | A | * | 12/1985 | Deaver | 296/180.1 |
| 4,629,240 | A | * | 12/1986 | Dornier | 296/180.5 |
| 5,236,242 | A | * | 8/1993 | Seeman | 296/180.1 |
| 5,966,845 | A | * | 10/1999 | DiGiacomo | 37/231 |
| 6,183,041 | B1 | * | 2/2001 | Wilson | 296/180.1 |
| 6,338,524 | B1 | * | 1/2002 | Wu | 296/180.1 |
| 7,213,870 | B1 | * | 5/2007 | Williams | 296/180.5 |
| 7,226,117 | B2 | * | 6/2007 | Preiss | 296/180.1 |
| 2005/0189786 | A1 | * | 9/2005 | Spence et al. | 296/180.2 |

* cited by examiner

*Primary Examiner* — Glenn Dayoan
*Assistant Examiner* — Sunsurraye Westbrook

(57) ABSTRACT

One or more airfoils, mounted above the upper surface of an automobile or other vehicle, optionally with variable angle of attack and/or camber, under the continuous automatic control of the vehicle's computer (electronic control module), for the purpose of providing well-distributed vertical thrust with minimum drag, or strong downward thrust with drag, depending on driving circumstances, thereby increasing the safety of the vehicle as well as improving its efficiency and performance.

9 Claims, 5 Drawing Sheets

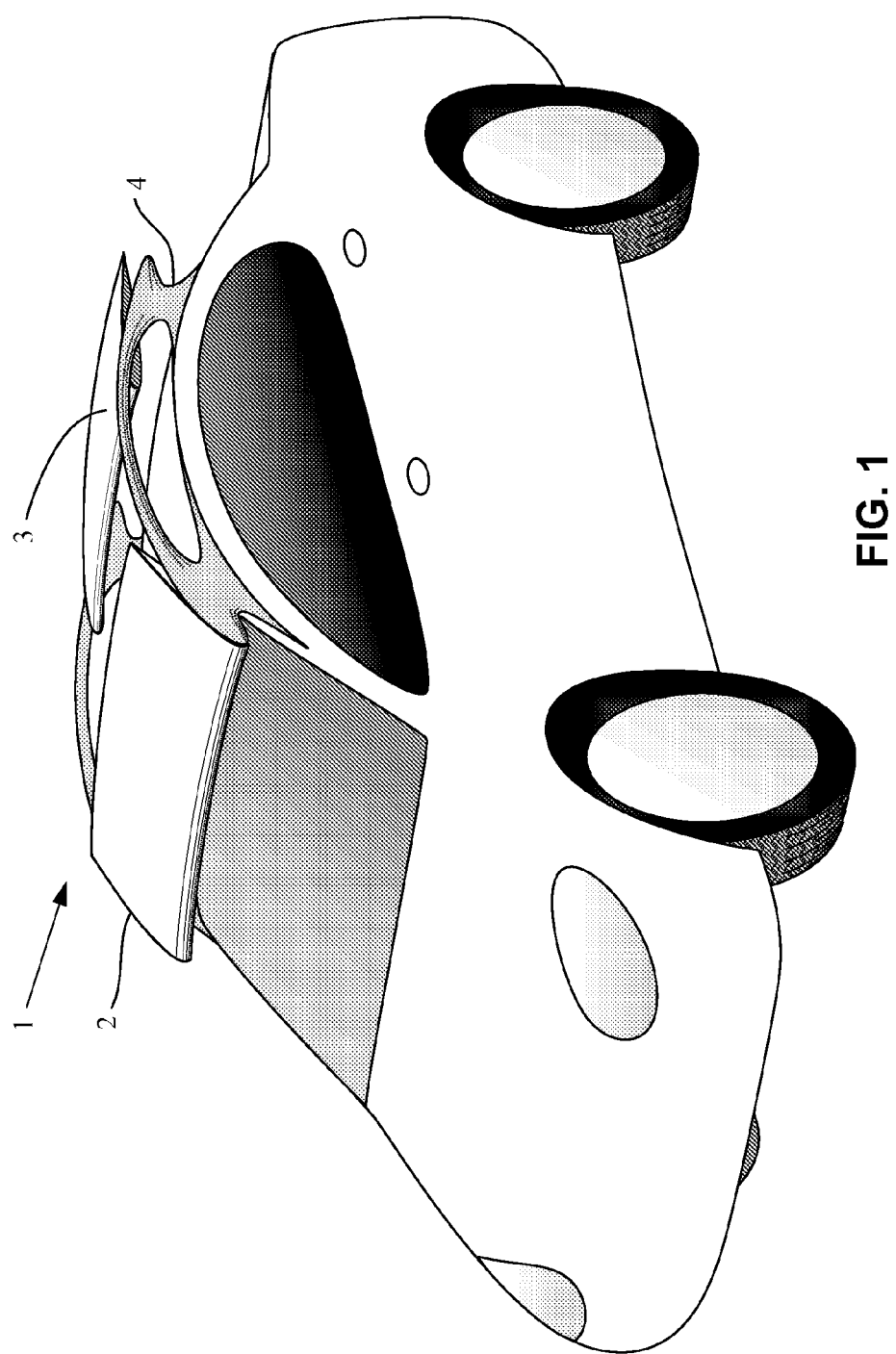

VEHICLE AIRFOILS FOR SAFETY, EFFICIENCY, AND PERFORMANCE

This invention was not made under federally sponsored research or development of any kind.

REFERENCES CITED

U.S. PATENT DOCUMENTS

| | | | |
|---|---|---|---|
| 4,247,066 | January 1981 | Frost et al. | 244/219 |
| 4,530,301 | July 1985 | Latham | 114/102 |
| 5,419,608 | May 1995 | Takemoto | 296/180.1 |
| 6,045,096 | April 2000 | Rinn et al. | 244/219 |
| 6,540,282 B2 | April 2003 | Pettey | 296/180.5 |
| 6,672,651 | June 2004 | Shuen | 296/180.5 |
| 7,114,456 B2 | October 2006 | Sohy | 114/102.22 |
| 7,213,870 | May 2007 | Williams | 296/180.1 |
| 7,226,117 | June 2007 | Preiss | 296/180.1 |
| 7,264,300 | September 2007 | Hillgaertner | 296/180.5 |
| 7,322,638 B2 | January 2008 | Larson | 296/180.5 |

OTHER PUBLICATIONS

Jacobs E N, Ward K E, Pinkerton R M. 1932. The characteristics of 78 related sections from tests in the variable-density wind tunnel. NACA Report. 460.

National Research Council of the National Academies. 2006. Tires and Passenger Vehicle Fuel Economy: Informing Consumers, Improving Performance. Transportation Research Board Special Report 286.

FIELD OF THE INVENTION

This invention relates generally to airfoils mounted on wheeled vehicles, including automobiles, vans, buses, recreational vehicles, trucks, and trains. More particularly, this invention has to do with airfoils that may be fixed or adaptively varied to improve the safety, efficiency and performance of such vehicles.

BACKGROUND OF THE INVENTION

Wheeled vehicle transportation accounts for a major portion of global energy consumption and contributes much of the pollution and greenhouse gases produced by the world. The energy required of the propulsion system of a wheeled vehicle is determined by three factors: aerodynamic drag, rolling resistance, and the energy needed to overcome inertia to accelerate the mass of the vehicle and its contents.

Demand for increasing fuel efficiency and performance has led to the design of ever more streamlined vehicles, pressing close to the limit of practically achievable reductions in aerodynamic drag. Therefore, if further substantial reductions in the energy requirements of vehicles are to be realized in the design of vehicle bodies, improvements should include reductions in the rolling resistance and inertial mass of vehicles.

Rolling resistance is very largely due to the energy losses caused by flexing of the wheels and deformation of the surface over which the wheels roll (National Research Council of the National Academies 2006). These energy loses are directly proportional to the force pressing the wheels against the surface. That force is due to the weight of the loaded vehicle, modified by any aerodynamic force pressing upward or downward on the vehicle. Therefore, reduction in vehicle mass would reduce rolling resistance as well as inertia. However, efforts to design lighter vehicles have been limited by handling and safety problems at high speeds because reduction in the weight pressing the wheels against the road results in less traction for accelerating, turning, and braking. An aerodynamic system that would provide constant, well-distributed downward thrust at high speeds could yield some energy savings simply by making it possible to design lighter vehicles without compromising safety, maneuverability, and acceleration at high speeds. The reduced inertial mass of such a vehicle would require less power to achieve acceleration comparable to that of current vehicle designs. However, except at low speeds, rolling resistance would not be reduced. Substantially greater energy savings could be achieved by means of an aerodynamic system that adaptively provides varying amounts of vertical thrust (upward or downward) in response to driving circumstances. Upward thrust could be provided during linear cruising. Downward thrust would be provided during maneuvering, turning, accelerating, and braking. Substantial drag in addition to maximum downward thrust could be provided during strong braking and sharp turns at high speeds. A vehicle fitted with such an adaptive aerodynamic system would attain energy savings while also improving handling, safety and performance.

At least since the 1920's, some innovative racing cars have employed airfoils, known as "wings," designed to produce downward thrust to increase traction and improve handling at high speeds. In 1928, the rocket-propelled race cars Opel RAK1 and RAK2 had stubby wings mounted on the sides of the body behind the front wheels. In 1956 Michael May added a large wing above the middle of a Porsche Type 550 car. In 1966 µm Hall mounted a large wing about a meter above the rear axle of his Chaparral 2E racing car. The angle of attack of the wings of both Michael May and Jim Hall could be controlled manually by the driver. Such manually-controlled wings would be impractical for ordinary (non-racing) vehicles, but might have led to the development of automated airfoil systems that would be practical for ordinary street and highway driving, but for the fact that, after each of the innovations of Michael May and Jim Hall, rules were developed to proscribe such continuously variable wings from racing competition. Large fixed wings are mounted above the front and middle of the relatively high power-to-weight-ratio racing cars known as sprint cars.

In recent years it has become fashionable to install a kind of "wing" on passenger cars, especially on sports cars. On such vehicles, as a general rule, a single wing, cambered to generate down-thrust, is located above and across the rear edge of the upper surface of the car. In this location, well behind the rear wheels, the wing levers upward on the front wheels, reducing the traction of the front wheels at high speeds. Because most modern automobiles use the front wheels for propulsion a well as for steering and braking, wings in this location diminish automobile performance as well as safety, handling, and fuel efficiency. Additionally, in this location, wings obstruct somewhat the rear view of the driver, further degrading safety. U.S. Pat. No. 5,419,608 issued May 30, 1995 to Takemoto disclosed the positioning of fixed airfoils on the underside of an automobile, between the wheels. In that location, restricted space and turbulent air flow among the steering, suspension and propulsion mechanisms of the vehicle severely constrain achievement of even the limited purposes of such fixed airfoils. As with that patent, designs disclosed in other patents as well as airfoils actually installed on modern cars are generally fixed or may be adjustable, but are not designed to be under continuous adjustment by the driver or by some automatic system such as the vehicle computer. An exception is an air brake U.S. Pat. No. 6,540,282 B2 issued Apr. 1, 2003 to Pettey. This airbrake provided only one (air braking) of the numerous advantages of the present invention. Another exception is a rear end spoiler incorporating an adjustable wing, disclosed in U.S. Pat. No. 7,226,117 issued Jun. 5, 2007 to Preiss, the sole purpose of which is to reduce drag by controlling air flow at the upper rear edge of vehicles of the station wagon or hatchback type. U.S. Pat. No. 7,264,300 issued Sep. 4, 2007 to Hillgaertner discloses a mechanism for adjusting a rear spoiler wing, but the adjustment comprises only raising (deploying) and lowering (stowing) the spoiler wing without any change in angle of attack or shape. U.S. Pat. No. 7,213,870 issued May 8, 2007 to Williams discloses a mechanism for adjusting both the angle of attack and the extent of surface area of a spoiler. However, in all configurations, this spoiler is designed to exert more or less down-thrust behind the rear wheels of the automobile, entailing all the safety, handling and efficiency problems noted above.

SUMMARY OF THE INVENTION

The primary purpose of the present invention is to use airfoils to improve the safety, efficiency, handling, and performance of vehicles, rectifying the deficiencies and reversing the dangerous effects of airfoils previously and currently employed on vehicles.

One or more airfoils are positioned substantially above the vehicle wheelbase. They provide down-thrust, well distributed over the vehicle wheels, increasing traction when additional traction is advantageous, such as during acceleration, braking, and turning. They also increase vehicle stability in crosswinds and turbulence. In preferred embodiments of the invention, the airfoils adaptively and automatically change angle of attack and/or camber, providing airbraking as well as strong down-thrust during strong braking and sharp turns, but alternatively providing lift when the vehicle is driven in a straight line at constant speed.

BRIEF DESCRIPTION OF THE DRAWINGS

FIG. 1 is a perspective view of an automobile mounted with two airfoils having fixed camber but variable angle of attack, adjusted to provide moderately strong down-thrust.

In FIG. 2 and FIG. 4, some structures are depicted as semitransparent so that structures behind them may be discerned.

Figure 2A:
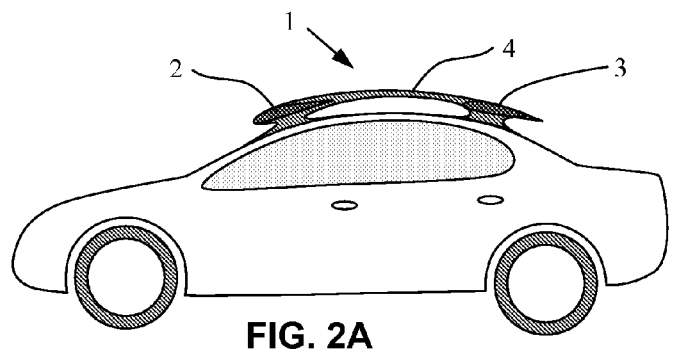
FIG. 2 shows diagrammatic side views of an automobile with two airfoils having variable-reversible camber as well as variable angle of attack, in various positions: (A) angled and cambered to provide lift to reduce rolling friction while cruising in a straight line, (B) angled and cambered to provide moderate down-thrust for maneuvering in traffic at speed, (C) angled to provide maximum down-thrust and turbulent drag during strong braking, (D) angled to assist in securing luggage carried on the roof of the vehicle and to reduce the aerodynamic drag caused by such luggage, and (E) angled to provide maximum shade over the windshield when the vehicle is parked.
Figure 2B:
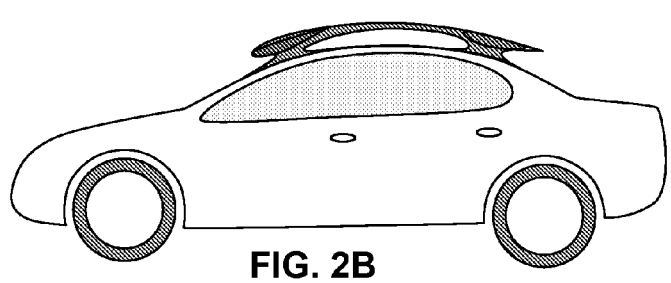
Figure 2C:
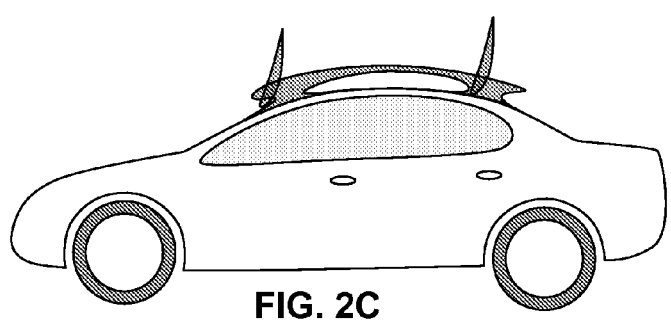

| DRAWING REFERENCE NUMERALS | |
|---|---|
| 1 | airfoil apparatus |
| 2 | forward airfoil |
| 3 | rear airfoil |
| 4 | airfoil support structure |
| 5 | endplate |
| 6 | axle of airfoil |
| 7 | pylon |
| 8 | actuator |
| 9 | pinion gear |
| 10 | ring gear |
| 11 | connecting arm |
| 12 | drive pin |
| 13 | forward rib plate |
| 14 | skin |
| 15 | attachment of forward rib plate to skin |
| 16 | leading edge roller |
| 17 | rear rib plate |
| 18 | attachment of rear rib plate to skin |
| 19 | trailing edge member |
| 20 | forward rib plate linkage pin |
| 21 | axis of rotation of forward rib plate |
| 22 | rear rib plate linkage pin |
| 23 | axis of rotation of rear rib plate |
| 24 | trailing edge stop |
| 25 | safety spring |
| 26 | ligature |
| 27 | fairing |

DETAILED DESCRIPTION

Most of the safety, performance and efficiency advantages of the present invention can be achieved by mounting a single airfoil (not illustrated) above the upper surface of a vehicle, substantially spanning the width of the vehicle and positioned approximately midway between the front and rear axles of the vehicle, or somewhat closer to the front wheels if the front wheels provide steering and propulsion in addition to braking. In the simplest embodiment of the invention, this airfoil has a fixed camber and angle of attack such that the airfoil exerts down-thrust at speed, making it possible for the vehicle to be constructed of low-density materials, such as aluminum and composites, without compromising safety and performance. Such a vehicle yields gains in efficiency due to reduced weight and therefore lowered rolling resistance at low speeds, and because a vehicle having less mass requires less energy to accelerate.

Additional improvements in efficiency can be achieved by an embodiment of the invention in which the angle of attack of the airfoil is variable and is controlled automatically by the electronic control module of the vehicle, that is, by the vehicle computer. Depending on driving condition, such an airfoil can provide variable amounts of down-thrust, or even lift, reducing rolling resistance when down-thrust is not needed for maneuvering. Such an airfoil may have a fixed shape, with little or no camber. An example of such an airfoil shape is NACA 0012 (Jacobs et al. 1932) used in the wing of the Lockheed C-5 Galaxy aircraft and the rotor blades of helicopters. To minimize the force required to adjust and maintain the angle of attack, the adjustment of the angle of attack may be made by pivoting the airfoil around its aerodynamic center.

FIG. 1 shows a perspective view of a sedan-type automobile with two such fixed-camber, variable-angle-of-attack airfoils. In this embodiment of the present invention, the airfoil apparatus 1 comprises a forward airfoil 2 and a rear airfoil 3 supported by an airfoil support structure 4 that can serve the additional function of a roof rack for carrying luggage.

Further efficiency gains may be achieved if the airfoils are provided with variable camber as well as variable angle of attack. Airfoils in the lift-providing configuration have a convex upper surface and a more flat under surface. To minimize drag while providing down-thrust during acceleration and turning, the shape of the airfoils may be adaptively adjusted. Airfoils may be provided with flexible skin and articulating supporting structure such that, as the control system raises the trailing edge of an airfoil, the upper surface flattens and the under surface becomes more convex (see the example mechanism disclosed below).

FIG. 2 shows schematic side views of a sedan-type automobile equipped with two such airfoils, having variable camber and variable angle of attack, in various configurations selected automatically by the automobile computer or manually, depending on driving or parking conditions. While the vehicle is driven in a straight line at constant cruising speeds, the airfoils are aligned with the airstream flowing over the surface of the vehicle, and shaped to provide lift (FIG. 2A), thereby reducing rolling resistance and increasing fuel efficiency. When the steering wheel is turned, or the accelerator or brake pedal is pressed, the vehicle computer automatically adjusts the airfoil to generate down-thrust (FIG. 2B), pressing the vehicle downward against the roadway, thus improving the ability of the vehicle to turn, accelerate, or brake without tire slippage. As the brake pedal is further pressed, the airfoil control system raises the trailing edge of the airfoils, increasing the angle of attack and deflecting the airflow upward. In this configuration, the airfoils not only improve the effectiveness of the existing braking system by increasing down-thrust, and hence tire traction; they also augment the conventional brakes by generating turbulent drag, thereby serving as airbrakes (FIG. 2C). The control system also instantly increases the deflection of the airfoils when sensors detect any deviation between the course of motion of the vehicle and the orientation and rotation of the wheels, effectively detecting and counteracting (with increased downward thrust) any tendency for the wheels to slip. Deflection of the airfoils is also triggered when vehicle sensors detect any crosswind or turbulence, such as that generated by a passing large truck. Thus the airfoils not only increase the efficiency of the vehicle, they also improve its handling, performance and especially its safety.

For safety; strong springs instantly return the airfoils to a default, reverse camber position, pushing the vehicle downward (FIG. 2B) whenever there is a loss of power or other fault in the airfoil attitude control system while the vehicle is in motion.

Figure 2D:
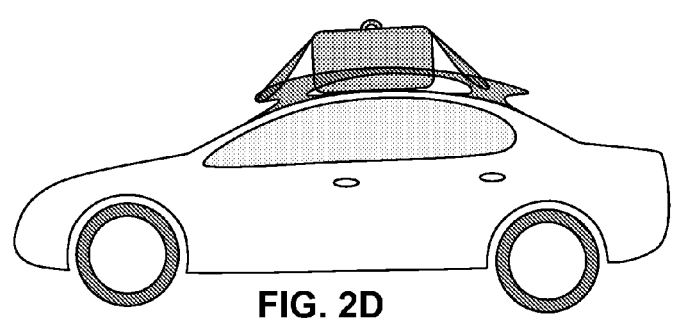

The airfoils and their support structure may also serve as a roof rack, the airfoils rotating to help secure, as well as provide streamlining for items of luggage stowed on the roof (FIG. 2D).

Figure 2E:
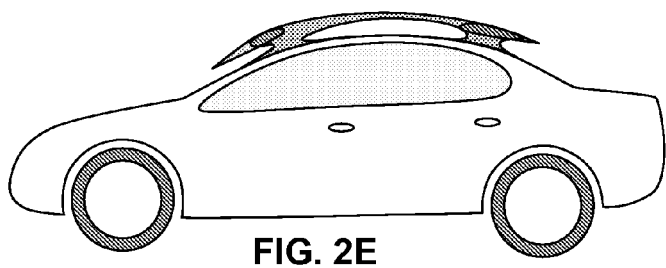

Airfoils may serve the additional function of providing sun shades for the windshield and windows of the vehicle. When the vehicle is parked, the front airfoil may be rotated automatically (or with manual override) to an inverted position, maximizing the shading of the windshield (FIG. 2E).

Panels of photovoltaic cells (not illustrated) may be incorporated into the surfaces of the airfoils, so that while the vehicle is parked, these panels may be automatically oriented by the airfoil control system to optimize the generation of electricity for charging the vehicle battery system. Such a solar charging system would be particularly useful for electric or hybrid vehicles. Brake lights (not illustrated) may be mounted under transparent skin on the underside of the rear airfoil so that when brakes are activated, automatically tilting the airfoil upward, these lights will be exposed and directed toward following traffic.

Figure 3A:
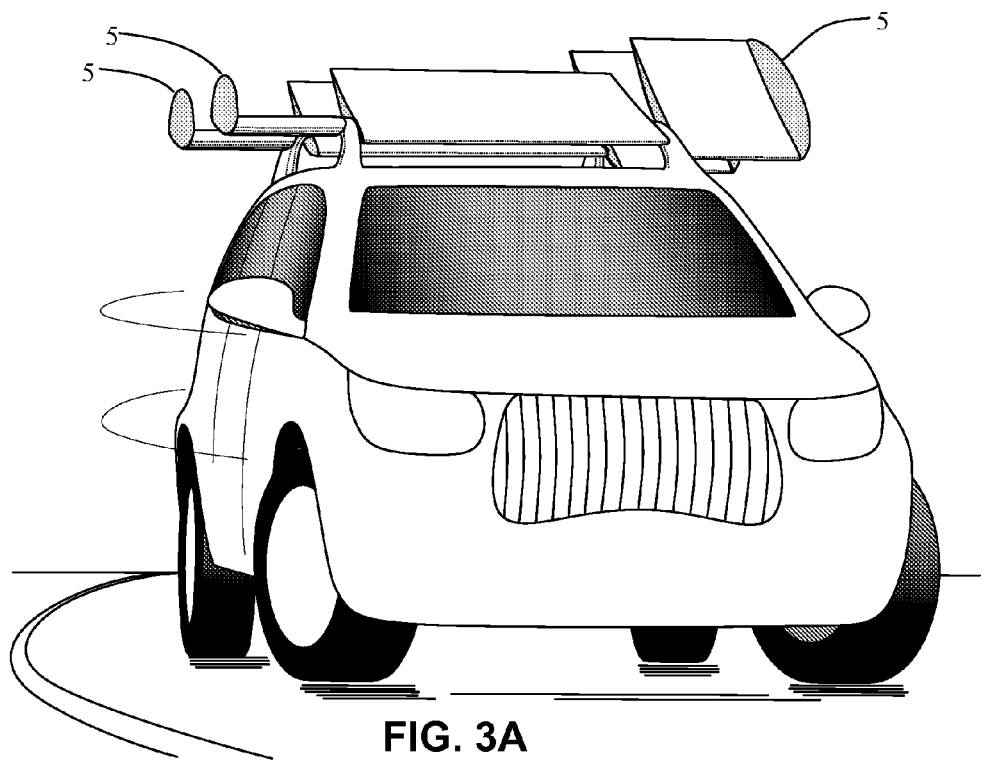
FIG. 3 shows two perspective views of a van (A) with two airfoils, each subdivided into three segments, each segment having independently and automatically controlled variable-reversible camber as well as variable angle of attack, adjusted to counter the tendency of the vehicle to roll over while turning at high speed, and (B) without airfoils, in accordance with prior art.
Figure 3B:
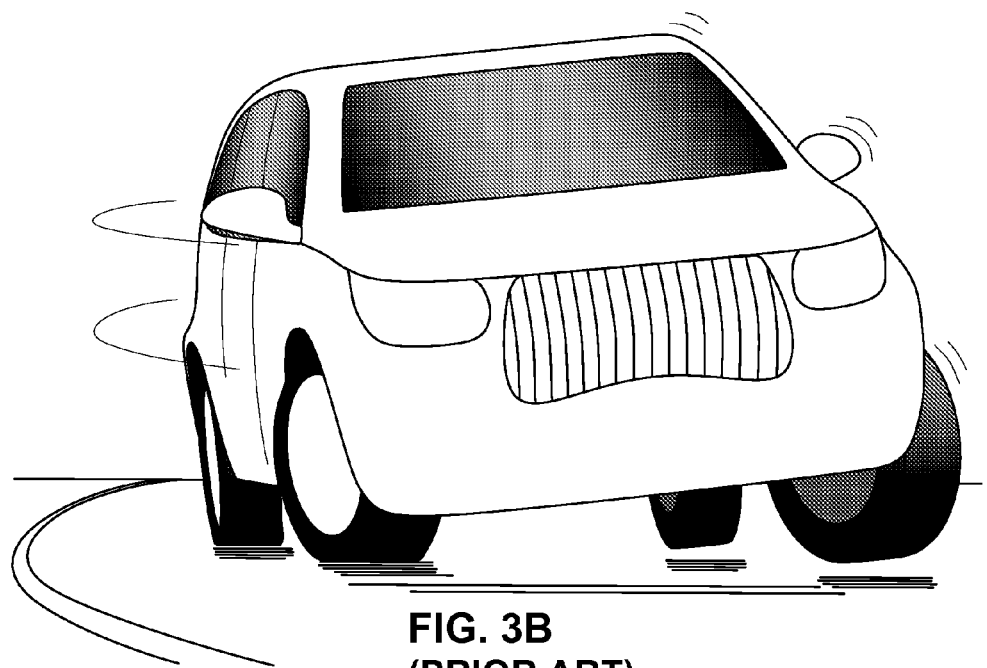

The span of each airfoil may be subdivided into two or more independently controllable sections (FIG. 3), enabling the airfoil system to exert greater down-thrust on one side of the vehicle than the other, thereby counteracting the tendency of the vehicle to roll over when turning. The section (or sections) of airfoil nearest the inside of the turn automatically deflects upwards to a greater extent than the outer section (FIG. 3A), thus more strongly pressing downward on the wheels situated on the inside of the turn, which otherwise tend to rise during high-speed turns (FIG. 3B).

Airfoils may be provided with endplates 5 or winglets at the lateral ends for the purpose of reducing induced drag caused by wingtip vortices.

Various methods may be used to adjust adaptively the shape of the airfoil so that it can vary between exerting down-thrust and lift. Conventional aircraft employ ailerons and elevators to accomplish this purpose, at some cost in aerodynamic drag caused by wing surface discontinuities when the ailerons or elevators are angled substantially. Other methods of adjusting and reversing camber are disclosed in U.S. Pat. No. 4,247,066 issued Jan. 27, 1981 to Frost et al., U.S. Pat. No. 4,530,301 issued Jul. 23, 1985 to Latham, U.S. Pat. No. 6,045,096 issued Apr. 4, 2000 to Rinn et al., and U.S. Pat. No. 7,114,456 B2 issued Oct. 3, 2006 to Sohy. One improved means of minimizing drag while controlling both the shape and angle of attack of a vehicle airfoil is shown in FIG. 4 and described below. Other improved methods may be disclosed in subsequent patents.

Figure 4A:
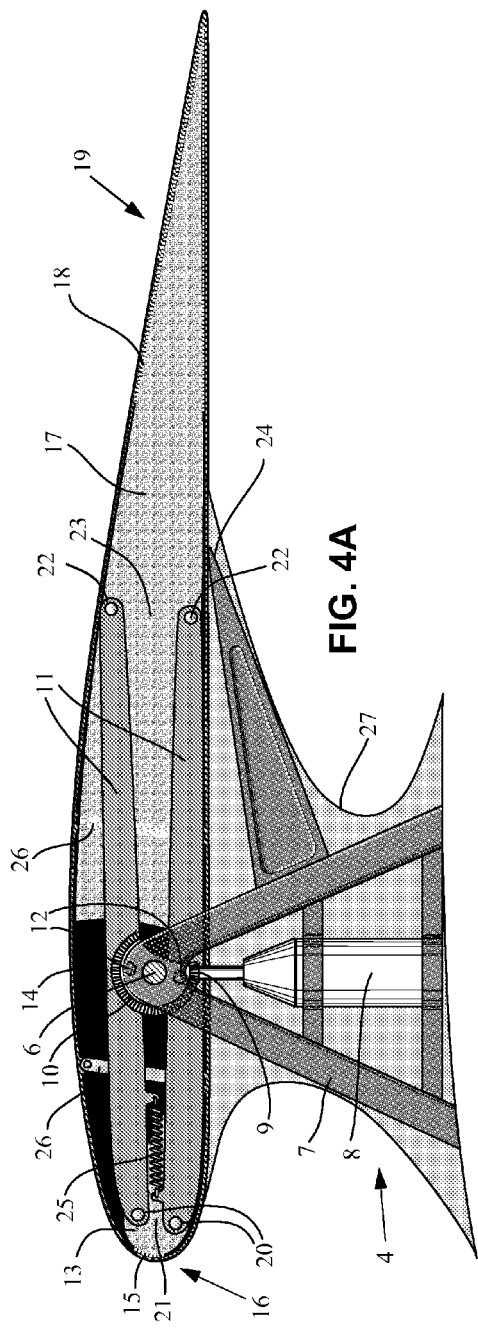
FIG. 4 shows three diagrammatic side views of an airfoil revealing one possible mechanism for varying and reversing camber as well as angle of attack: (A) cambered and positioned to provide lift with minimum drag, (B) cambered and positioned to provide down-thrust with minimum drag, and (C) cambered and positioned to provide strong down-thrust with turbulent drag.
Figure 4B:
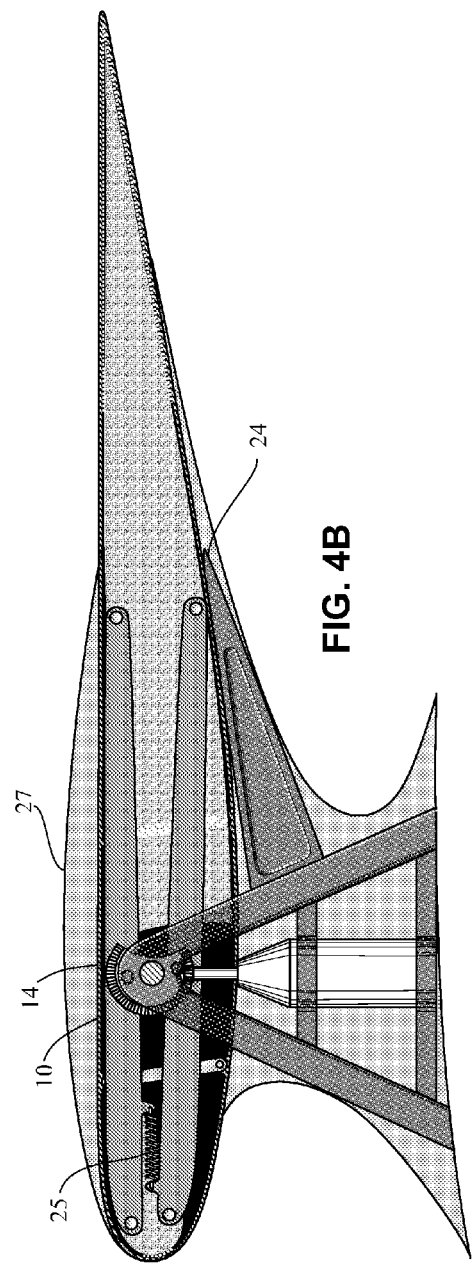
Figure 4C:
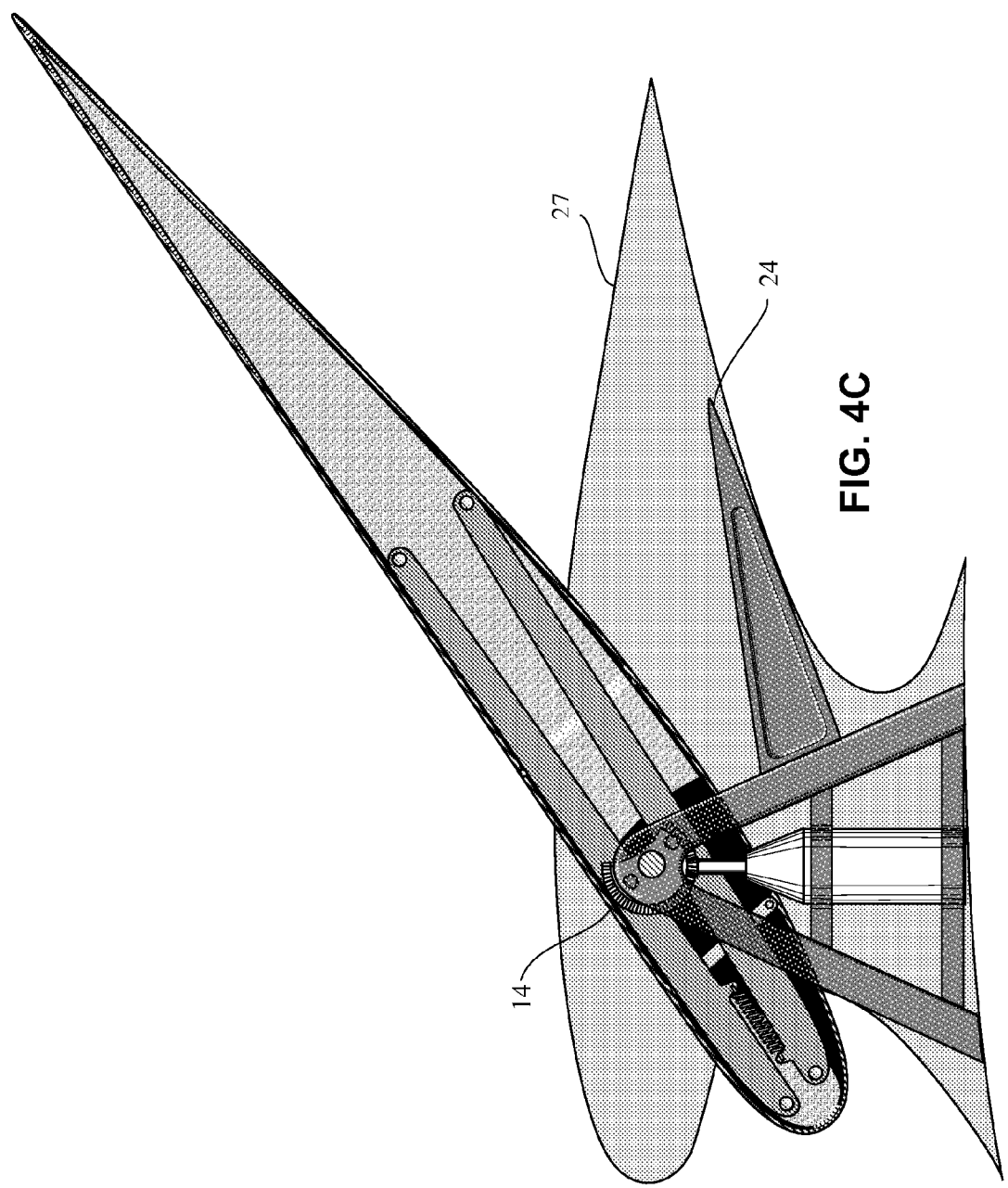

The adaptive airfoil that is illustrated in FIG. 4 pivots on an axle 6 that runs approximately along the aerodynamic center of the airfoil, and which transmits aerodynamic forces exerted on the airfoil to the vehicle via pylon 7. An actuator 8 (which may be an electric stepper motor or a hydraulic or pneumatic driver) drives a pinion gear 9 that drives a ring gear 10 around the axle. Connecting arms 11 link the ring gear 10 via drive pins 12 to a forward rib plate 13, which is firmly attached 15 to the airfoil skin 14 only along its forward edge, thus effectively forming a semicylindrical leading edge roller 16 that can roll the skin around the leading edge of the airfoil. The connecting arms 11 also link the ring gear 10 to a rear rib plate 17, which is firmly attached 18 to the skin 14 near the trailing edge of the airfoil forming a tiltable wedge-shaped trailing edge member 19. The linkage 20 of the connecting arms 11 to the forward rib plate 13 is farther from the skin and closer to the axis of rotation 21 of the forward rib plate than is the linkage 22 of the connecting arms 11 relative to the skin and the axis of rotation 23 of the rear rib plate 17. Therefore, rotation of the leading edge roller 16 is relatively amplified, causing the leading edge roller to roll the skin around the leading edge farther than the skin is moved by the trailing edge member 19 as it is tilted by the rotation of the ring gear 10. This results in tightening and flattening the lower skin and bulging the upper skin (FIG. 4A) or visa versa (FIG. 4B), depending on the direction of rotation of the ring gear 10. After rotation of the ring gear maximally flattens the upper surface of the airfoil, further rotation in the same direction tilts the airfoil, raising its trailing edge (FIG. 4C), deflecting the airstream upward and increasing turbulent drag as well as downward thrust. Rotation of the ring gear 10 in the opposite direction lowers the trailing edge of the airfoil until it comes down against a trailing edge stop 24. Further rotation of the ring gear 10 in that direction bulges the upper surface of the airfoil, changing its shape to a lift-generating configuration (FIG. 4A). If any fault causes failure of the control system when the airfoil is in the lift configuration (FIG. 4A), a strong spring 25 instantly returns the airfoil to a default down-thrust configuration (FIG. 4B) for safety.

A number of additional forward and rear rib plates (not illustrated) are distributed along the length of the airfoil, passively supporting the leading and trailing edges of the airfoil, moving in compliance with the attitude control exerted by the control mechanisms at the ends of the airfoil span or segment. Where the skin is unsupported by rib plates, the skin may be strengthened by a latticework of skin stringers (not illustrated), which assist in transferring upward or downward force from the surface of the airfoil to the vehicle via leading edge roller 16, trailing edge member 19, connecting arms 11, ring gear 10, and pylon 7. In areas of the airfoil where the skin is not attached to rib plates, the skin may be supported by a latticework of stringers on the inner surface of the skin. In such areas, ligatures may connect the skin on opposite surfaces of the airfoil, allowing opposite surfaces to move freely in opposite chordwise directions while not moving apart under aerodynamic force. Ligatures may be straps 26 that articulate with stringers or other protrusions from the skin, or ligatures may be strands or span-wise septa that are sufficiently flexible that no articulations are needed. Pylon 7 and actuator 8 are enclosed in a light-weight, streamlined fairing 27. A control mechanism such as depicted in FIG. 4 may be provided on each of the two lateral ends of the span or central segment of an airfoil. If the airfoil is divided into three separately-articulating segments, as in FIG. 3A, then each pylon may support two actuators, one to control an outboard segment, and one to share (with the other side) in controlling the central segment.

Although the figures and description above contain many specific details, these merely provide illustrations and examples of some embodiments of this invention. Various other manifestations, variations, and modifications are possible within its scope. For example, in FIG. 4, for simplicity of illustration, rib plates are shown as solid plates, whereas to save weight, these plates may be perforated by a series of holes. As with this example, the particular arrangements herein disclosed are meant to be illustrative only and are not to be construed as limiting the scope of the invention, which includes any and all applications, variations, modifications and equivalents within the spirit and scope of the appended claims.

What is claimed is:

1. An aerodynamic apparatus for a vehicle comprising one or more airfoils situated substantially above the wheelbase of the vehicle so as to be capable of exerting well-distributed downward thrust on the wheels that steer, propel and brake the vehicle.

2. An apparatus of claim 1 in which the airfoils, in response to driving circumstances, are capable of providing controllable downward thrust or lift by means of variable angle of attack and/or variable camber.

3. An apparatus of claim 2 in which the airfoils passively and immediately return to a down-thrust configuration in the event of any malfunction or failure of the airfoil control system.

4. An apparatus of claim 3 in which the span of each airfoil is subdivided laterally into two or more independently variable sections capable of simultaneously providing different amounts of down-thrust or lift on the two sides of the vehicle to counteract any tendency of the vehicle to roll.

5. An apparatus of claim 3 or 4, in which the airfoils are substantially under automatic control, not requiring any action by the driver.

6. An apparatus of claim 5 in which the airfoils are controlled by the electronic control module of the vehicle, that is, by the vehicle computer.

7. An apparatus of claim 6 in which the underside of the rear-most airfoil incorporates brake lights that are directed toward following traffic when the rear edge of the airfoil rises to assist in braking.

8. An apparatus of claim 1 in which one or more surfaces of the airfoils incorporate photovoltaic cells for generating electricity.

9. An airfoil having a variable, reversible camber by means of an internal support structure consisting of several articulating parts including a rolling member along the leading edge of said airfoil, rounded and affixed to the skin along its forward edge; a rigid, substantially wedge-shaped trailing edge support member, affixed to the skin along the rear of said member; connecting arms linking leading and trailing members and connecting them to an actuator; and flexible, inelastic skin continuously covering said airfoil.

* * * * *